(12) United States Patent
Shi et al.

(10) Patent No.: US 7,373,087 B2
(45) Date of Patent: May 13, 2008

(54) ADAPTIVE OPTICAL TRANSPONDER

(75) Inventors: Feng Shi, Kanata (CA); Genzao Zhang, Ottawa (CA); Xiaoli Fu, Nepean (CA); Jinghui Li, San Jose, CA (US); Tongqing Wang, Los Altos, CA (US); John Ralston, Portola Valley (CA); Moni G. Mathew, San Jose, CA (US)

(73) Assignee: Oplink Communications, Inc., Fremont, CA (US)

( * ) Notice: Subject to any disclaimer, the term of this patent is extended or adjusted under 35 U.S.C. 154(b) by 338 days.

(21) Appl. No.: 10/789,804

(22) Filed: Feb. 27, 2004

(65) Prior Publication Data

US 2005/0031355 A1 Feb. 10, 2005

Related U.S. Application Data

(60) Provisional application No. 60/449,865, filed on Feb. 27, 2003.

(51) Int. Cl.
*H04B 10/12* (2006.01)

(52) U.S. Cl. .................. 398/147; 398/148; 398/158

(58) Field of Classification Search ............ 398/25–29, 398/158, 147–149, 192–194
See application file for complete search history.

(56) References Cited

U.S. PATENT DOCUMENTS

| 5,361,319 | A  | * | 11/1994 | Antos et al. ............... 385/123 |
| 5,671,075 | A  | * | 9/1997  | Ramachandran et al. ... 398/147 |
| 5,822,094 | A  | * | 10/1998 | O'Sullivan et al. .......... 398/18 |
| 6,694,273 | B2 | * | 2/2004  | Kurooka et al. .............. 702/69 |
| 2001/0046348 | A1 | * | 11/2001 | Sarkimukka et al. ......... 385/24 |
| 2002/0123851 | A1 |   | 9/2002  | Kurooka et al. .............. 702/69 |
| 2002/0126355 | A1 | * | 9/2002  | Bulow ........................ 359/161 |
| 2003/0011847 | A1 | * | 1/2003  | Dai et al. ................... 359/161 |
| 2004/0086274 | A1 | * | 5/2004  | Wan et al. ...................... 398/9 |
| 2004/0105682 | A1 |   | 6/2004  | Roberts et al. ............. 398/147 |

* cited by examiner

*Primary Examiner*—Dzung Tran
(74) *Attorney, Agent, or Firm*—Fish & Richardson P.C.

(57) ABSTRACT

Systems and methods for optical communications. In one implementation, a communications device is provided. The communications device includes an Optical domain Adaptive Dispersion Compensation Module (OADCM); an Electrical domain Adaptive Distortion Compensation Module (EADCM); and a controller coupled to, and operable to selectively control, both the OADCM and the EADCM.

15 Claims, 7 Drawing Sheets

ADAPTIVE OPTICAL TRANSPONDER

CROSS-REFERENCE TO RELATED APPLICATIONS

This application is a claims priority to U.S. Provisional Application Ser. No. 60/449,865, filed on Feb. 27, 2003.

BACKGROUND

The following specification relates to optical communications.

Opto-electrical technologies have been developed to support the transmission and reception of optical signals through optical fiber channels, including controlling signal distortion induced by optical fibers. Dispersion is a significant source of signal distortion. Controlling dispersion is becoming increasingly difficult as optical communication systems progress towards higher data rates. Conventionally, dispersion compensation includes the use of dispersion compensators located at various points along an optical signal propagation path.

SUMMARY

Systems and methods for optical communications. In general, in one aspect, a communications device is provided. The communications device includes an Optical domain Adaptive Dispersion Compensation Module (OADCM), an Electrical domain Adaptive Distortion Compensation Module (EADCM), and a controller coupled to, and operable to selectively control, both the OADCM and the EADCM.

Implementations can include one or more of the following features. The controller can control operating characteristics of at least one of the OADCM and the EADCM. The controller can control the OADCM based on feedback information provided to the controller from the EADCM. The controller can control the EADCM based on feed forward information provided to the controller from the OADCM.

The communications device can further comprise an Optical Amplifier with automatic-Gain Control (OAGC) coupled to the OADCM and the controller. The communications device can further comprise a PIN photodiode detector in combination with a trans-impedance amplifier (PIN/TIA) coupled to the OAGC and the controller. The communications device can be integrated into an optical signal receiver, wherein the EADCM provides signal distortion measurements to the controller taken from an incoming signal. The controller in turn adjust the respective operating characteristics of the OADCM.

In operation at least one of the EADCM and OADCM can apply dispersion compensation to the incoming signal. The EADCM can provide polarization mode dispersion compensation. The OADCM can provide chromatic dispersion compensation.

The communications device can be integrated into an optical signal transmitter wherein in operation at least one of the EADCM and OADCM provides pre-emphasis to a transmitted optical signal to substantially overcome dispersion the transmitted optical signal will encounter en route to a receiver. The EADCM can include an equalizer that produces symbol estimates. The EADCM can include a blind equalizer that produces error values.

In general, in another aspect, An Electrical domain Distortion Compensation Module. The Electrical domain Distortion Compensation Module includes a Multi-Phase Eye Quality Monitor (MPEQM) and an equalizer circuit. The MPEQM includes a clock recovery path for retrieving a clock signal from an incoming signal; a first comparator path for comparing a first portion of the incoming signal to a scanning reference, the first comparator path timed according to the clock signal from the clock recovery path; a second comparator path for comparing a second portion of the incoming signal to an optimal timing reference, the second comparator path timed according to the clock signal from the clock recovery path; and a difference accumulator for keeping track of the number of instances that respective outputs from the first and second comparator paths differ, as a measure of the eye quality. In some implementations the MPEQM can be integrated into an Electrical domain Adaptive Distortion Compensation Module.

In general, in another aspect, a method of controlling an Optical domain Adaptive Dispersion Compensation Module (OADCM) is provided. The method including: i) taking signal distortion measurements from an incoming signal in the electrical domain; ii) processing the signal distortion measurements to produce at least one OADCM control value; and iii) applying the OADCM control value to the OADCM.

In general, in another aspect, a method of translating channel states into a Channel Value (CV) at a time t and state i assuming that a channel has a memory length L is provided. The method includes: i) estimating tap weight-vectors $h1$ and $h2$; and ii) calculating CV.

In general, in another aspect a method of Blind Channel Initialization is provided. The method includes: i) collecting a set of error measurements corresponding to different permutations of elements belonging to at least one tap-weight vector; and ii) selecting the permutation of the elements of the at least one tap-weight vector that corresponds to a minimum error measurement collected in step i). The following specification can be implemented to provide some or all of the following advantages. A joint electro-optical distortion compensation system is provided to simplify an optical communication system, thus reducing costs and making the optical communication system more versatile. The joint electro-optical distortion compensation system can provide dispersion compensation on either the receiver side or transmit side of an optical propagation path as either correction or pre-emphasis respectively.

Implementations can provide improved optical signal quality. Further, implementations can provide for simplification of the network design; reconfigurability of network topology; reduction of inventory; reduction of turn-up time in the field; and a more robust network against aging, temperature change, and re-routing. The joint electro-optical distortion compensation system provided by the invention provides variable or tunable dispersion compensation modules that can be integrated into an optical transponder.

Other aspects and features of the present invention will become apparent, to those ordinarily skilled in the art, upon review of the following description of several implementations.

DETAILED DESCRIPTION

Figure 1:
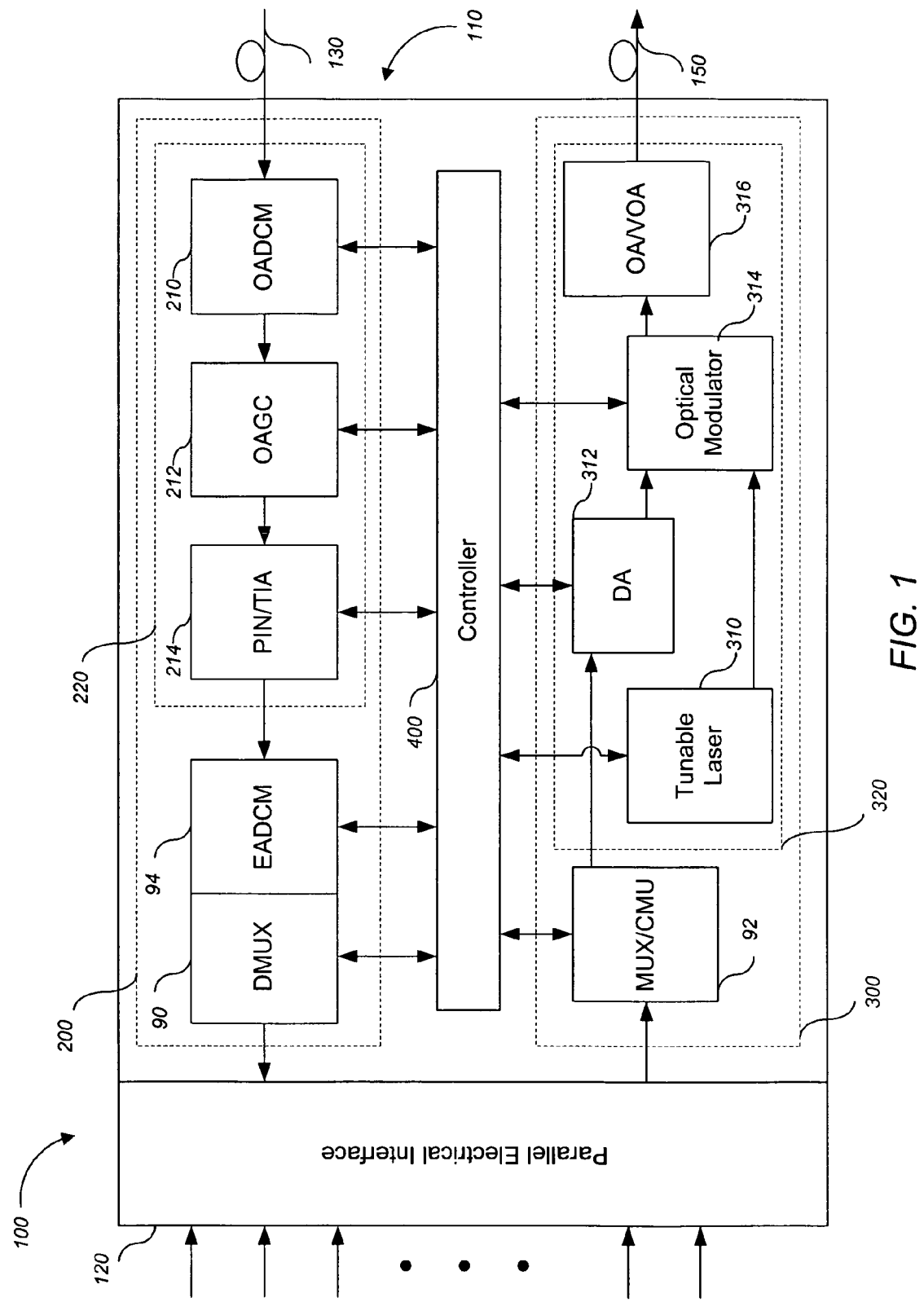
FIG. 1 is a schematic view of an adaptive optical transponder according to one implementation.

Shown in FIG. 1 is a schematic view of an adaptive optical transponder 100 according to one implementation. The adaptive optical transponder 100 includes a reception signal chain 200, a transmission signal chain 300, a parallel electrical interface 120, and a controller 400. An optical input terminal 130 and an optical output terminal 150 are used to couple corresponding optical signals into and out of the reception signal chain 200 and transmission signal chain 300 respectively. In one implementation, illustrated by FIG. 1, both the reception signal chain 200 and transmission signal chain 300 share access to the parallel electrical interface 120.

The controller 400 is coupled to both the reception transmission signal chain 200 and the transmission signal chains 300 at various points in order to receive information and deliver control signals to components within each signal chain. In one implementation, the controller 400 can be a microprocessor alone or a microprocessor in combination with other control circuitry. In other implementations, the controller 400 can be a programmable digital logic device (e.g., a FPGA) or an application specific integrated circuit (ASIC). Generally, the controller 400 can be any suitable combination of hardware, software, and firmware.

Starting from the optical input terminal 130, the reception signal chain 200 has in series an Optical domain Adaptive Dispersion Compensation Module (OADCM) 210, an Optical Amplifier with automatic-Gain Control (OAGC) 212, and a PIN photodiode detector in combination with a trans-impedance amplifier (PIN/TIA) 214. The OADCM 210, OAGC 212, and PIN/TIA 214 make up an optical reception signal chain 220 belonging to the reception signal chain 200. The PIN/TIA 214 is further coupled in series to an Electrical domain Adaptive Distortion Compensation Module (EADCM) 94, which is in turn coupled in series to a demultiplexer (DMUX) 90. The DMUX 90 is coupled to the parallel electrical interface 120 to deliver a parallel electrical signal stream.

The EADCM 94 is coupled indirectly to the OADCM 210 through the controller 400 to create a feedback control loop as a part of a joint electro-optical distortion compensation system 110 integrated into the adaptive optical transponder 100. The EADCM 94 feeds back performance and/or signal quality information to the controller 400, which in turn adjusts the OADCM 210. In an alternative implementation the OADCM 210 can be adapted to provide feed-forward signal information that can be used by the controller 400 to control the EADCM 94.

Starting from the parallel electrical interface 120, the transmission signal chain 300 has, in series, a Multiplexer in combination with a Clock Multiplier Unit (MUX/CMU) 92 and an optical transmission signal chain 320. The optical transmission signal chain 320 includes a Driver Amplifier (DA) 312 and a tuneable laser (TL) 310, both of which are coupled to provide respective inputs to an optical modulator 314. An output of the optical modulator (MOD) 314 is coupled to an Optical Amplifier in combination with a Variable Optical Attenuator (OA/VOA) 316 that is in turn coupled to the optical output terminal 150 to deliver an optical output signal.

In some implementations of the adaptive optical transponder 100, an additional combination of hardware, software and firmware can be used to support the operation of the adaptive optical transponder 100. For simplicity, FIG. 1 illustrates only those features necessary to describe the adaptive optical transponder 100.

The joint electro-optical dispersion compensation system 110 can be integrated into the reception signal chain 200. The joint electro-optical dispersion compensation system 110 provides compensation for, or correction of, dispersion induced by the optical propagation path on a received (incoming) optical signal. In alternative implementations the joint electro-optical dispersion compensation system 110 can provide a transmitted optical signal with an amount of pre-emphasis to substantially overcome the dispersion that an optical signal would experience en route to a destination.

The adaptive optical transponder 100 can be used for optical systems (long-haul, metro-networks, SONET, SDH-single channel, DWDM) adapted to handle high data rates in the tens of Giga-bits-per-second or higher (e.g., 10 Gbps, +40 Gbps) corresponding to, for example, OC-192, OC-768 and SFI-x standards and recommendations.

In operation, in the transmitting direction, multiple parallel channels carrying relatively low rate (e.g., 16×622 Mbps for 10 Gbps transponder, 17×2.5 Gbps for 40 Gbps transponder) electrical signals are coupled into the parallel electrical interface 120. In one implementation, the parallel electrical interface 120 is adapted to conform to an SFI-x (e.g., SFI-4 for 10 Gbps, SFI-5 for 40 Gbps) interface (or other electrical interface for high data rate communications). In one implementation of the parallel electrical interface 120, respective electrical signals on the multiple parallel channels are error detected and skew compensated relative to a de-skew channel. The skew compensated parallel electrical signals can then be multiplexed by the MUX/CMU 92 into a single high rate serial electrical signal (e.g., 10 Gbps or 40 Gbps) that is sent to the optical transmission signal chain 320. The optical transmitter signal chain 320 then converts the serial electrical signal into an optical signal of the same rate and transmits the optical signal into an optical fiber through the optical output terminal 150.

Within the optical transmission signal chain 320, the DA 312 normalizes the serial electrical signal to a pre-defined level and swing range so that the serial electrical signal can be optimally utilized by the MOD 314. In one implementation, the DA 312 has an operating bandwidth wider than the data bandwidth (e.g., 13 GHz for a 10 Gbps transceiver, 45 GHz or higher for a 40 Gbps transceiver).

The MOD 314 can be any type of Electro-Optical modulator (e.g., Electro-absorptions Modulator (EAM), or Mach-Zehnder Modulator (MZM)) that is operable to provide the performance targets for a particular implementation of the adaptive optical transponder 100.

In one implementation, the TL 310 is a tunable high quality continuous waveform (CW) laser diode with a narrow line-width (e.g., 20 MHz for a 40G transponder, 10 Mhz for a 10G transponder) and a low relative intensive noise (e.g., −140 dB/Hz max). The OA/VOA 316 is adapted to control the output power transmitted by the adaptive optical transponder 100.

In operation, in the receiving direction, an incoming optical signal (e.g., at 40 Gbps) is first received via the optical input terminal 130 and into the optical reception signal chain 220. The optical reception signal chain 220 converts the incoming optical signal into a serial electrical signal of the same rate and applies a first dispersion compensation treatment on the incoming optical signal. The OADCM 210 applies the first dispersion compensation treatment. In one implementation, the OADCM 210 is adapted to provide chromatic dispersion compensation.

Figure 2:
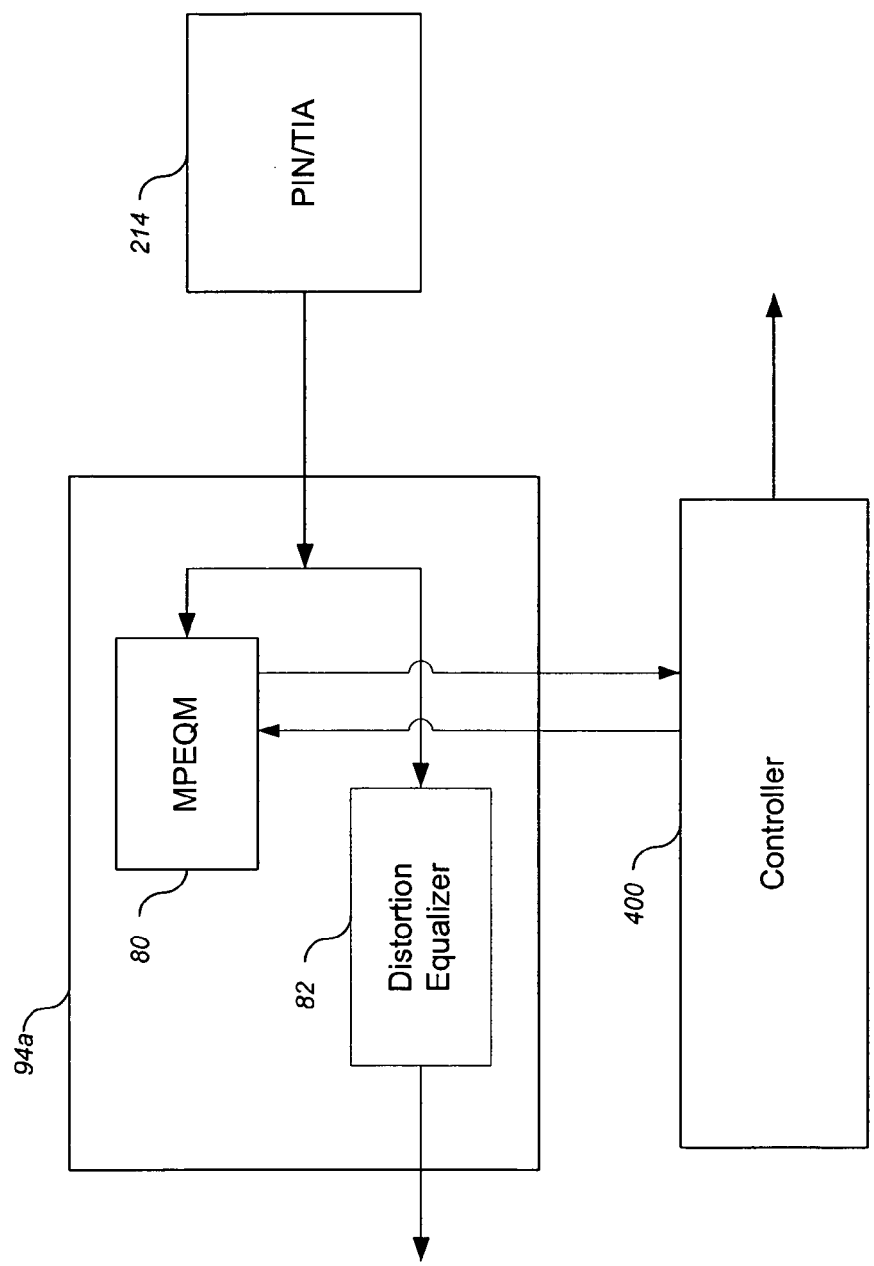
FIG. 2 is a schematic view of one implementation of the Electrical domain Adaptive Dispersion Compensation Module (EADCM) shown in FIG. 1.
Figure 3:
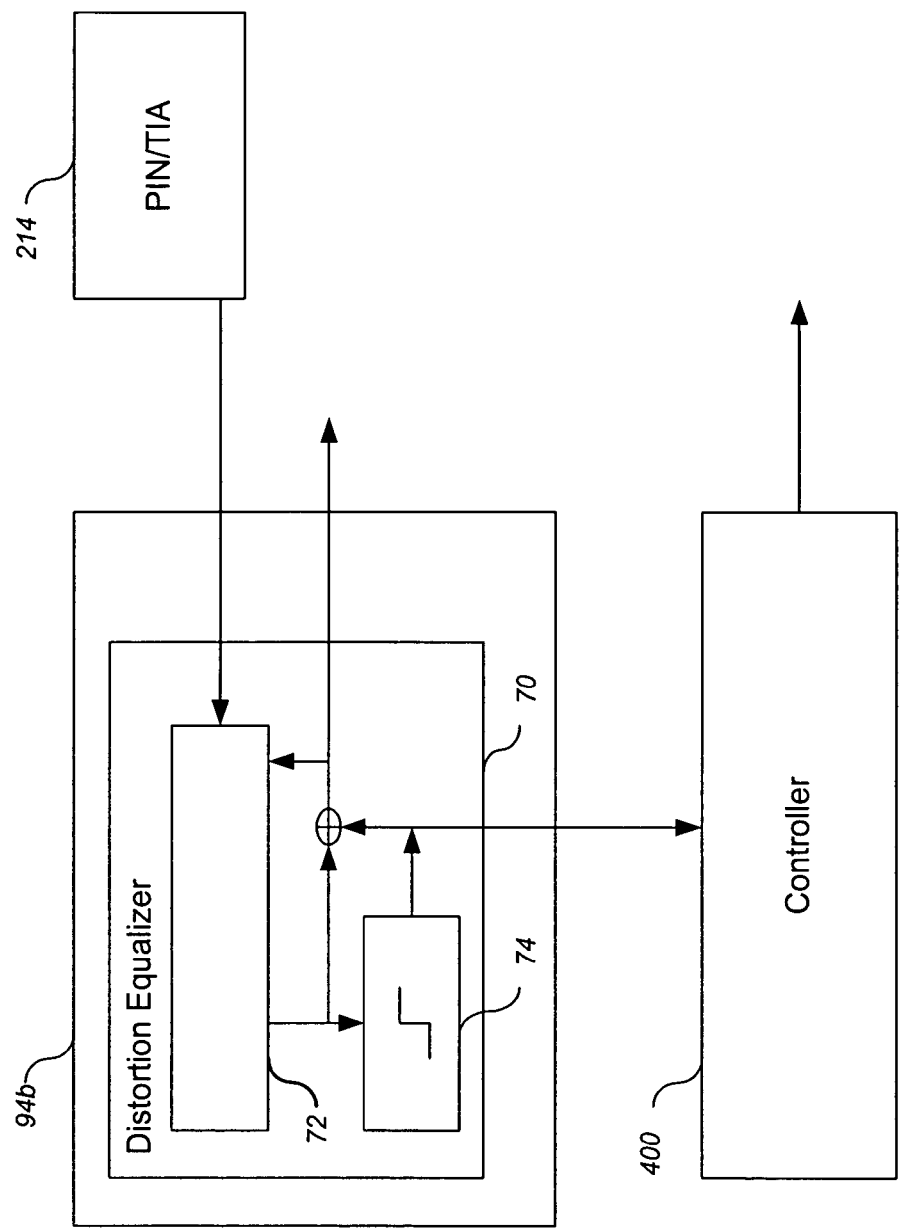
FIG. 3 is a schematic view of one implementation of the EADCM shown in FIG. 1.
Figure 4:
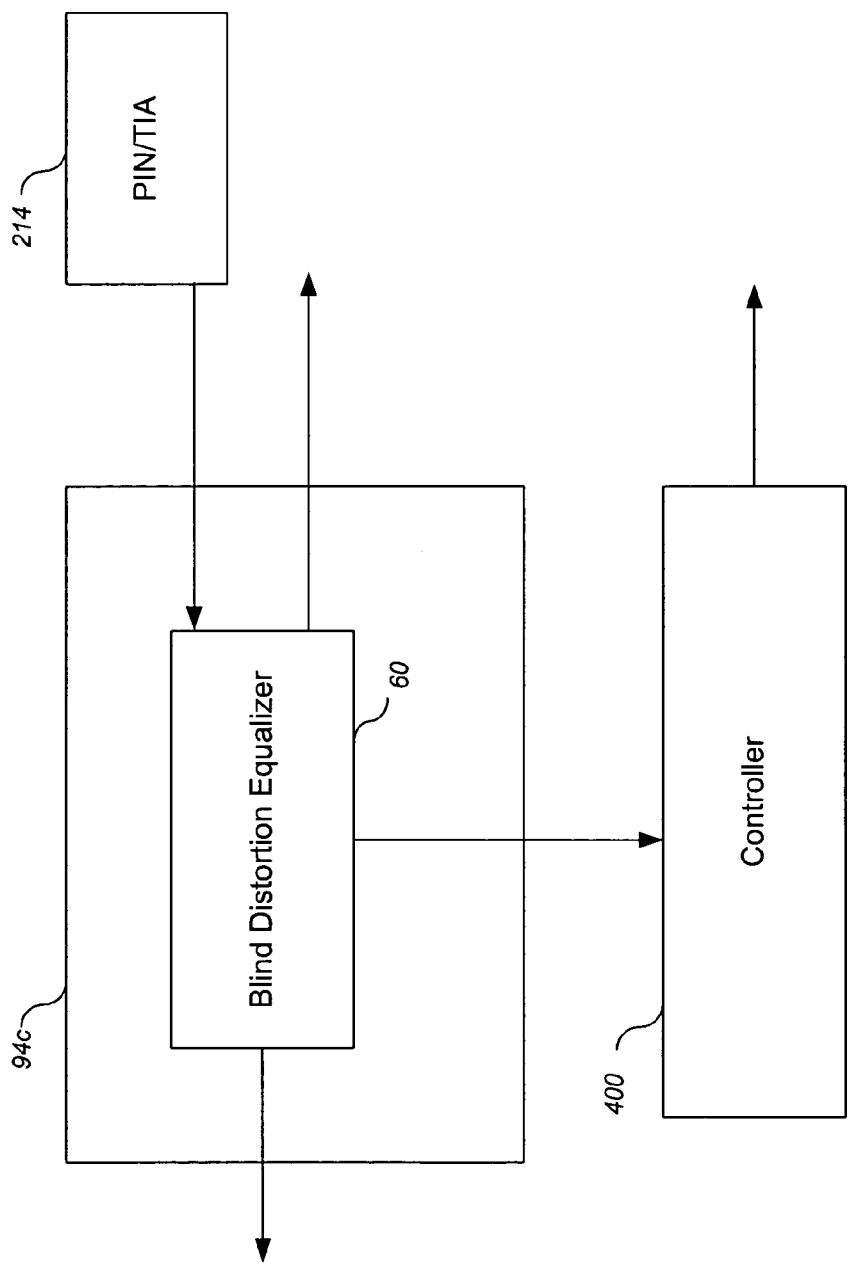
FIG. 4 is a schematic view of one implementation of the EADCM shown in FIG. 1.

The serial electrical signal is then coupled into the EADCM 94. The EADCM 94 recovers the data and clock timing from the serial electrical signal. The EADCM 94 also applies a second dispersion compensation treatment to the serial electrical signal. In one implementation, the type of dispersion compensated for by the EADCM 94 is Polarization Mode Dispersion (PMD) or PMD-like dispersion, which can change quickly over time. In other implementations, the EADCM 94 can also compensate for CD and other types of distortions. In one implementation, the EADCM 94 also measures signal distortion measurement from the serial electrical signal that is fed back through the controller 400 so as to be able to adjust, for example, the OADCM 210. FIGS. 2-4 below illustrate implementations of an EADCM 94 that can measure signal distortion.

After processing by the EADCM 94 the serial electrical signal is demultiplexed into multiple parallel channels of electrical signals (e.g., 16×622 Mbps for 10 Gbps transponder, 17×2.5 Gbps for 40 Gbps transponder) by the DEMUX 90. Within the parallel electrical interface 120, which can be adapted to conform to SFI-x recommendations (e.g., SFI-4 for 10G, SFI-5 for 40G), the multiple parallel channels of the electrical [data] signal are coupled out of the adaptive optical transponder 100 and, for example, into a network system.

Based on the signal distortion measurements taken in the EADCM 94, the controller 400 and the OADCM 210 combine to provide compensation for CD, PMD, and other optical link distortions. The EADCM 94 is implemented in the electrical domain and provides the functions of distortion error signal detection (i.e., taking signal distortion measurements) and fast dynamic Inter-Symbol Interference (ISI) equalization. The OADCM 210 adaptively compensates the slowly varying signal distortions like Chromatic Dispersion (CD). In one implementation, the OADCM 210 and EADCM 94 can be operated simultaneously to improve different aspects of the signal quality. Both the OADCM 210 and EADCM 94 are controlled intelligently through the controller 400 such that one can operate independently of the other so that errors made by one are not compounded in the other, while also allowing information about the incoming signal retrieved in the EADCM 94 to be used in the OADCM 210.

Additionally, the OAGC 212 can be adjusted to match the sensitivity performance of the adaptive optical transponder 100 with the link loss compensation. In one implementation, the OAGC 212 is continually adjusted.

The signal distortion measurements taken in the EADCM 94 can be in a variety of forms, each of which having an effect on the implementation of the EADCM 94. For example, the signal distortion measurements can be taken in the form of: i) signal quality measurements; ii) received symbols error estimates; and iii) distortion error measurements. Described below are examples of how each of these can be implemented in the adaptive optical transponder 100 as adaptations in the EADCM 94.

Shown in FIG. 2 is a schematic view of one implementation of the EADCM 94 shown in FIG. 1. EADCM 94a is adapted to measure signal quality of the serial electrical signal. The EADCM 94a includes a Distortion Equalizer (DE) 82 and a Multi-Phase Eye Quality Monitor (MPEQM) 80.

In one implementation, the MPEQM 80 is coupled to receive three channels (Ch1, Ch2, Ch3) of the serial electrical signal as inputs. The controller 400 provides the MPEQM 80 with control (reference) signals. In turn the MPEQM 80 provides the controller 400 with a signal distortion measurement based on the qualities of the signal eyes that the controller processes. The MPEQM 80 is described below with respect to FIG. 5.

Shown in FIG. 3 is a schematic view of another implementation of the EADCM 94 shown in FIG. 1. EADCM 94b provides symbol error estimates to the controller 400. The EADCM 94b includes a Distortion Equalizer (DE) 70 having a decision device 74.

In one implementation, the DE 70 is a decision feedback equalizer. In alternative implementations, the distortion equalizer can be another type of equalizer, for example, a linear equalizer in combination with a decision device.

Shown in FIG. 4 is a schematic view of another implementation of the EADCM 94 shown in FIG. 1. EADCM 94c includes a blind equalizer 60 that is adapted to deliver mean square error values to the controller 400, allowing the controller 400 to create a control signal for the OADCM 210.

The EADCM's 94 (e.g., 94a, 94b, and 94c) each measure the quality of the serial electrical signal and the measurements are fed back to adjust the OADCM 210 through the controller 400. Other EADCM implementations are possible.

The operation of the OADCM 210 in response to the control signal generated by the controller 400 in combination with the EADCM's 94 is as follows. The OADCM 210 has two operation modes, an Initialization Mode and a Fine Tuning Mode (or Adaptive Control Mode). During Initialization Mode, the controller 400 defines a scanning procedure that operates to coarsely optimize the performance of the OADCM 210. The scanning procedure is described with respect to the MPEQM 80 below.

After meeting pre-defined conditions set for the Initialization Mode, the OADCM 210 is switched into the Adaptive Control Mode by the controller 400. In Adaptive Control Mode, the OADCM 210 is operated adaptively in a close-loop indirectly controlled by, for example, one of the three EADCM's 94 (e.g., 94a, 94b, 94c) described above.

The loop time constant during the Adaptive Control Mode can be in tens of minutes or hours. Moreover, other adaptive algorithms, such as LMS, RLS, and random working, can be used for updating dispersion compensation characteristics of the OADCM 210 during the Adaptive Control Mode.

Figure 5:
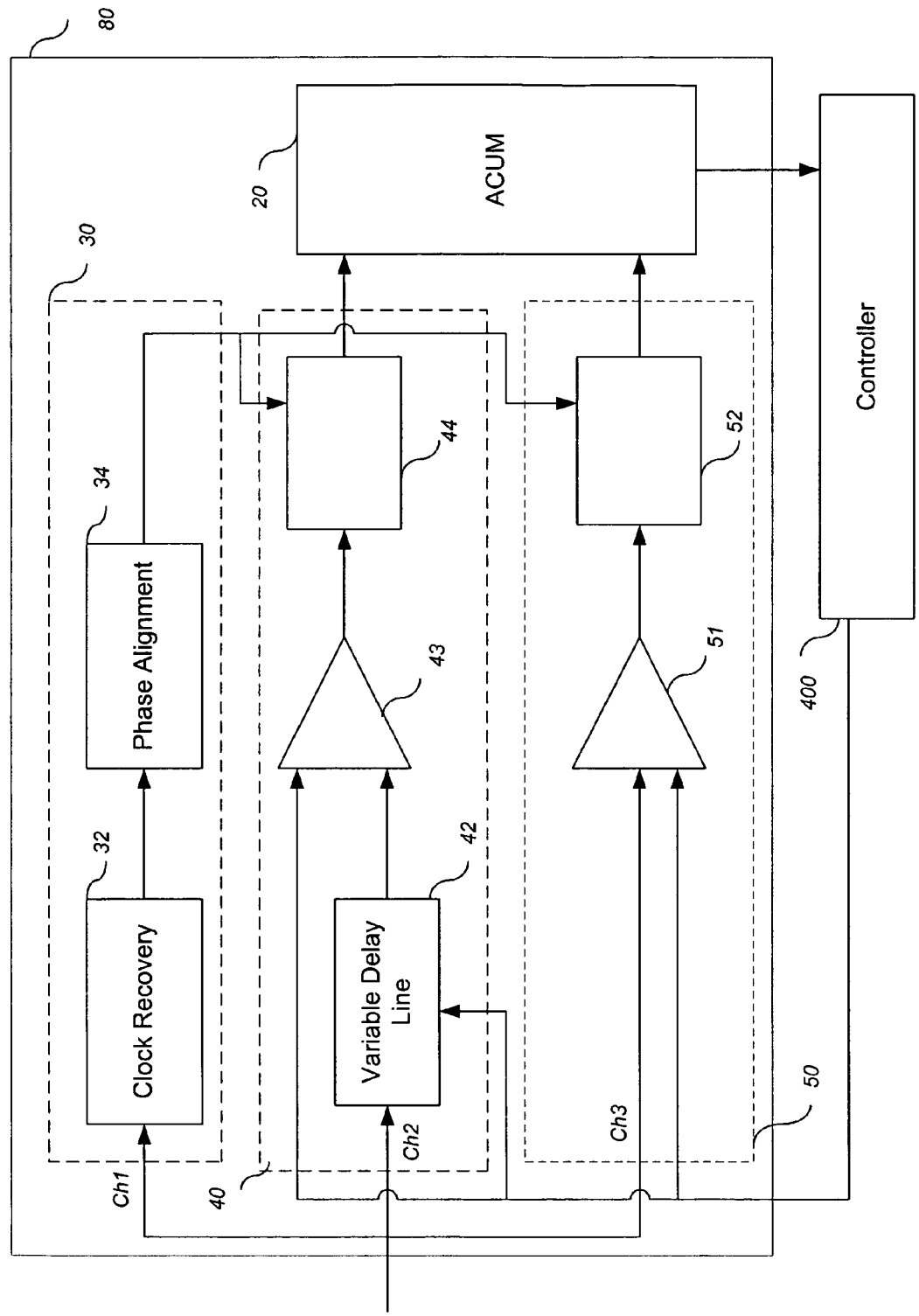
FIG. 5 is a schematic view of one implementation of the Multi-Phase Eye Quality Monitor (MPEQM) shown in FIG. 2.

Shown in FIG. 5 is a schematic view of the MPEQM 80 included in the EADCM 94a shown in FIG. 2. The MPEQM 80 includes a signal timing recovery and alignment branch 30, first and second comparator branches 40 and 50 respectively, and a difference accumulator (ACUM) 20.

The signal timing recovery and alignment branch 30 includes a clock recovery circuit 32 and a phase alignment circuit 34 coupled together in series. The clock recovery circuit 32 is coupled to receive a clock recovery channel separated from the serial electrical signal (Ch1). In turn the clock recovery circuit 32 is coupled to deliver an output to the phase alignment circuit 34. An output of the phase alignment circuit 34, which is also the output of the signal timing recovery and alignment branch 30, is then coupled into both the first and second comparator branches 40 and 50 respectively.

In one implementation, the clock recovery circuit 32 can, for example, be a PLL clock recovery circuit. The phase alignment circuit 34 can be a fixed phase delay line used to match an accommodated phase delay over the first comparator branch 40. Alternatively, in one implementation, the phase alignment circuit 34 can be a variable phase delay line.

The first comparator branch 40 includes a variable delay line 42, a first comparator (C1) 43, and a first register (D1) 44 coupled together in series respectively. The first comparator branch 40 receives four inputs: i) a first comparator channel from the serial electrical signal (Ch2); ii) a time delay signal $T_d$, having a period of T, from the controller 400; iii) a scanning step signal REF_SCAN also from the controller 400; and iv) the output of the signal timing recovery and alignment branch 30. The first comparator channel Ch2 and the time delay signal $T_d$ are coupled into the variable delay line 42 which produces an output that is coupled into the first comparator 43 as an input. The first comparator 43 is also coupled to receive the scanning step signal REF_SCAN from the controller 400. The output of the first comparator 43 (being a comparison of REF_SCAN to the output of the variable delay line 42) is coupled into to a signal terminal of the first register 44. The first register 44 also has a clock terminal to receive the output of the signal timing recovery and alignment branch 30.

The second comparator branch 50 includes a second comparator (C2) 51 and a second register (D2) 52 connected together in series respectively. The second comparator branch 50 receives three inputs: i) a second comparator channel from the serial electrical signal (Ch3); ii) an amplitude reference signal REF_OPT from the controller 400; and iii) the output of the signal timing recovery and alignment branch 30.

The amplitude reference signal REF_OPT is the optimized reference position for data symbol (i.e., '0' or '1') decision circuitry in the MPEQM 80. At the end of each scanning procedure, the REF_OPT will be updated by the controller 400 based on the estimation of noise distribution of each possible data symbol value. The second comparator channel (Ch3) and the amplitude reference signal REF_OPT are coupled into the second comparator 51 as inputs. The output of the second comparator 51 (being a comparison of Ch3 to REF_OPT) is coupled to a signal terminal of the second register 52. The second register 52 also has a clock terminal that is connected to receive the output of the signal timing recovery and alignment branch 30. The link between the first and second comparator branches 40 and 50, that keeps the respective outputs in phase, is the timing (clock) signal provided by the output of the signal timing recovery and alignment branch 30.

The ACUM 20 is coupled to receive outputs from the first and second registers 44 and 52 in parallel, as well as the recovered clock signal from the signal timing and alignment branch 30. In one implementation, the ACUM 20 includes an exclusive-OR (XOR) circuit block and one or more data counters.

In operation, the MPEQM 80 within the EADCM 94a, operates as follows. The clock recovery channel, Ch1, is coupled into the signal timing recovery and alignment branch 30 in order to recover the timing (clock) from the serial electrical signal. The first comparator channel, Ch2, passes through the variable delay line 42 and is coupled into the first comparator 43, in the first comparator branch 40; and in the second comparator branch 50 the second comparator channel, Ch3, is coupled into the second comparator 51.

Using the recovered clock signal from the output of the signal timing recovery and alignment branch 30, the respective outputs of first and second comparators 43 and 51 are latched into corresponding first and second registers 44 and 52. The outputs of the first and second registers 44 and 52 are considered clean (in terms of timing and the presence of glitches) digital signals and are designated DES_SCAN and DES_OPT respectively.

The clean digital signals DES_SCAN and DES_OPT are then passed to the ACUM 20. The ACUM 20 increments a counter when the DES_SCAN and DES_OPT differ and a Data Difference Rate (DDR) is continually derived and stored. The DDR is sent to the controller 400 for further processing from which statistical eye characteristics (SEC) are obtained. The SEC represent a two-dimensional (or multi-phase) eye statistical characteristic that can be used to determine the REF_SCAN, REF_OPT, $T_d$ and a period T.

The period T is determined by the controller 400 such that the ACUM 20 can not overflow in the period T and also so that the DDR can attain a reasonable value. In one implementation, a reasonable value for the DDR is in the range of $10^{-4}$S. Moreover, a value REF_OPT represents the optimal threshold for a '0' and '1' decision that can be derived through the statistical eye characteristics calculated by the controller 400.

The values of $T_d$, REF_SCAN, and T all range in value between respective minimums and maximums. During operation, the values of $T_d$, REF_SCAN, and T are incremented from a minimum value to a maximum value by respective step sizes. The relationships between minimum, maximum, and step size values for $T_d$, REF_SCAN, and T are summarized in Table 1.0 below.

TABLE 1.0

| Values Ranges for $T_d$, REF_SCAN and T | | | |
|---|---|---|---|
| Value | Minimum | Maximum | Step Size |
| $T_d$ | $T_{dmin}$ | $T_{dmax}$ | μt |
| REF_SCAN | $REF_{min}$ | $REF_{max}$ | μREF |
| T | $T_{min}$ | $T_{max}$ | Δt |

The controller 400 can be used to determine a control signal for OADCM 210 from signal distortion measurements taken from the EADCM 94. The controller 400 can also provide control and timing information to the EADCM 94a and more specifically to the MPEQM 80.

Figure 6:
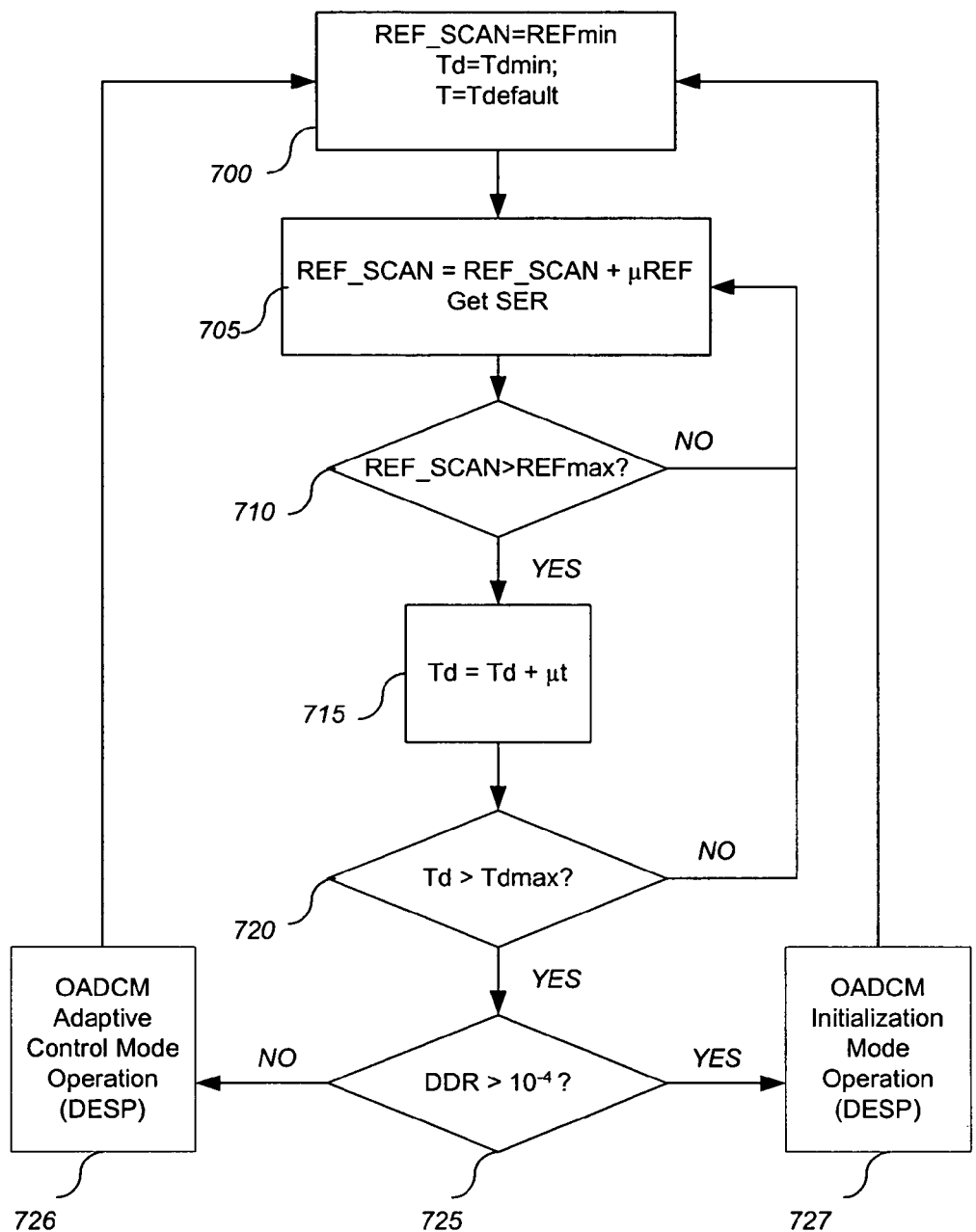
FIG. 6 is a flow chart illustrating control for the MPEQM shown in FIG. 5.

The controller 400 can use a method to combine a scanning process control for the MPEQM 80 and control processes for the OADCM 210. Referring now to FIG. 6, and with further reference to FIGS. 1, 2, and 5, the details of the control process for the OADCM 210 in combination with the MPEQM 80 included in the EDACM 94a are described. In a first step 700 REF_SCAN and $T_d$ are set to their respective minimum values, $REF_{min}$ and $T_{dmin}$ and T is first set to a default value of $T_{defalut}$. The controller 400 increments REF_SCAN by a value μREF and collects the DDR from the MPEQM 80 to calculate the SEC (step 705).

A comparison is made to determine whether or not REF_SCAN has exceeded a pre-determined maximum value $REF_{max}$ (step 710). If REF_SCAN has not exceeded the pre-determined maximum value $REF_{max}$ (no path, step 710), the controller 400 loops back to repeat step 705. If REF_SCAN has exceeded the pre-determined maximum value $REF_{max}$ (yes path, step 710), the controller 400 increments $T_d$ in value by μt (step 715). A comparison is made to determine whether or not $T_d$ has exceeded a pre-determined maximum value $T_{dmax}$ (step 720). If $T_d$ has not exceeded the pre-determined maximum value $T_{dmax}$ (no path, step 720), the controller 400 loops back to repeat step 705. If $T_d$ has exceeded the pre-determined maximum value $T_{dmax}$ (yes path, step 720), the controller 400 proceeds to step 725.

Another comparison is then made to determine whether or not the DDR is above a pre-determined threshold value $TH_{rds}$, for example $10^{-4}$s (step 725). The comparison is made to determine whether or not the controller 400 can continue on to an Adaptive Control Mode of Operation for the OADCM 210 or remain in (or switch back into) an Initialization Mode of Operation for the OADCM 210. If the DDR are above the pre-determined threshold value (yes path, step 725), the controller 400 remains within (or switches back into) the Initialization Mode of Operation (step 727). If the DDR is less than the pre-determined threshold (no path, step 725) the controller 400 moves into (or remains within) the Adaptive Control Mode of Operation (step 726).

A method of operation for the controller 400 in the Initialization Mode of Operation and the Adaptive Control Mode of Operation is provided. One implementation of the method can provide control and timing signals to the EADCM 94.

The Initialization Mode of Operation can be described with respect to FIG. 1. First, the controller 400 receives the DDR from the MPEQM 80. The controller 400 processes the DDR to calculate the SEC over a period of time $T_{lp}$. In one implementation, the duration of $T_{lp}$ can be several seconds. The SEC are computed and the signal eye is statistically mapped.

Using the statistical mapping of the signal eye, if the signal eye is found to be closed (i.e., the DDR>$10^{-4}$) the Initialization Mode of Operation continues (or is reactivated). Equivalently, an OADCM scan process is initiated in the OADCM 210. During the Initialization Mode of Operation the controller 400 delivers sequentially to the OACDM 210 a sequence (in one implementation, in ascending order) of OADCM CD compensation values (i.e., control points) that have successive step sizes that range, in one implementation, from 20 ps/nm to 50 ps/nm.

At each of the OADCM CD compensation values, the MPEQM 80 repeats the signal eye monitoring process shown in FIG. 6 (steps 700 to 725) to obtain a respective DDR signal from which a corresponding SEC can be obtained. When, based on the SEC, the signal eye is starting to open (i.e., DDR<the pre-determined threshold) the DDR criterion is satisfied and the controller 400 switches to the Adaptive Mode of Operation. The SEC value will increase as OADCM CD compensation values increase because the signal eye quality improves. However, there is a point of diminishing returns where there are no longer useful performance gains to be obtained by increasing the OADCM CD compensation value. The SEC can start to decrease if the OADCM CD compensation value is increased beyond the value required to compensate for the fiber induced CD. Accordingly, in one implementation, the controller 400 can be adapted to stop the scanning process (the Initialization Mode of Operation) once the point of diminishing returns is reached or when the SEC values start to decrease. In another implementation, the controller 400 can return the OADCM CD compensation value to the last value that provided the best compensation and then move on to the Adaptive Control Mode of Operation.

In accordance with a method of operation for the controller 400 the Adaptive Control Mode of Operation can be described. During the Adaptive Control Mode of Operation the controller 400 fine tunes the OADCM (e.g., OADCM 210) to optimize compensation for the optical propagation path induced CD. The step sizes for the OADCM CD compensation values can range in value from 1 ps/nm to 10 ps/nm. The controller 400 can use a gradient algorithm to locate a maximum SEC value(s). The loop time constant $T_{cst}$ for the Adaptive Control Mode of Operation can be fixed or variable, and range in value from the tens of minutes to the tens of hours.

In one implementation, the Adaptive Control Mode of Operation can include a multi-rate signal processing method to filter out PMD-like distortions from CD-like distortions. Multiple level dispersion estimation signals can also be generated over various periods of time, for example, over a short estimation period and a long estimation period for a particular OADCM CD compensation value.

In one implementation, the controller 400 has some control over the operation of the EADCM 94. However, in other implementations of the EADCM 94 that do not accept control of timing signals (e.g., EADCM 94b and 94c), the controller 400 can be adapted to operate without any direct control of the EADCM 94. For example, provided below is an illustrative example of how the method can be adapted for equalizer based EADCM's 94 (e.g., 94b and 94c), that do not accept a control or timing signal from the controller 400.

Referring now to FIG. 3, for both the Initialization and Adaptive Control Modes of Operation, the controller 400 accepts the symbol error estimates from the decision device 74 of DE 70 as inputs. Subsequently, the criterion to switch between the Initialization and Adaptive Control Modes of Operation can be derived from the symbol error estimates by calculating the statistical mean square value or equivalently the statistical expected value of the symbol error estimates. If the statistical expected value is larger than a pre-determined threshold, derived from the same, the Initialization Mode of Operation is maintained or re-initiated. If the statistical expected value is not larger than the pre-determined threshold, the Adaptive Control Mode of Operation is initiated or maintained.

Referring now to FIG. 4, in another implementation, for both the Initialization and Adaptive Control Modes of Operation, the controller 400 accepts the mean square error estimates ($E_{mse}$) from the blind distortion equalizer 60 as inputs. The criterion to switch between Initialization and Adaptive Control Modes of Operation is derived from the value of $E_{mse}$. If the $E_{mse}$ is larger than a pre-determined threshold, the Initialization Mode of Operation is maintained or re-initiated. If the $E_{mse}$ is smaller than a pre-determined threshold, the Adaptive Control Mode of Operation is initiated or maintained. A method of calculating the $E_{mse}$ is provided below.

Figure 7:
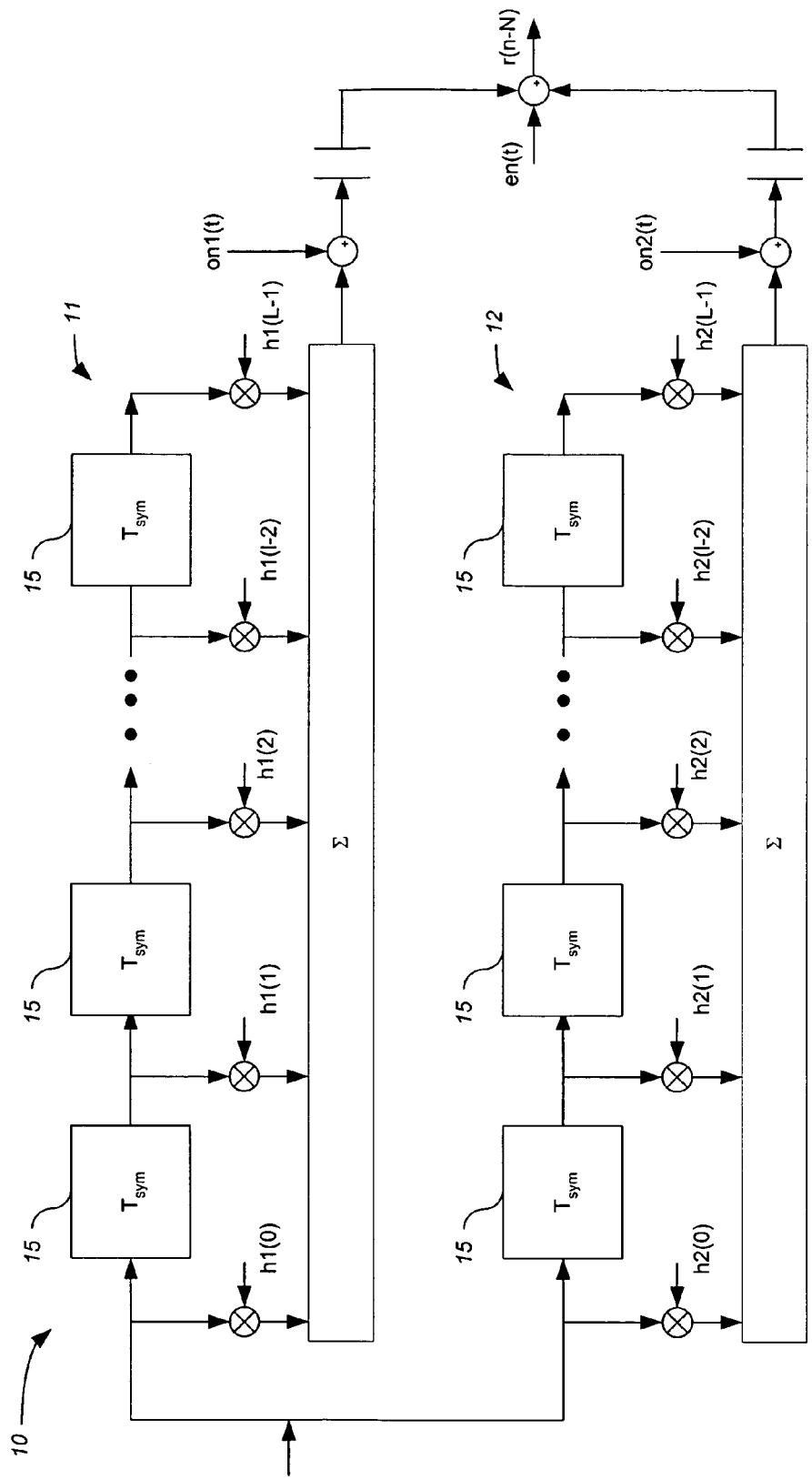
FIG. 7 illustrates a discrete-time channel distortion model.

FIG. 7 illustrates a discrete-time channel distortion model 10 that is used as an approximate characterization of an optical propagation path. Three methods are provided that are related to the discrete-time channel distortion model. The three methods are: i) a Dual-State Data Estimation Method; ii) a method to translate channel model states to a Channel Value (CV); and iii) a Blind Channel Initialization Method.

Referring to FIG. 7, the discrete-time channel distortion model 10 is made up of two tapped delay lines 11 and 12, each having delay elements (or registers) 15. Each tapped delay line 11 and 12 have corresponding tap-weight vectors, h1 and h2, that represent respective discrete-time channel impulse responses for two orthogonal polarization components of the model. The discrete-time channel impulse responses are known as discrete-time optical channel transfer functions. The terms on1(t) and on2(t) are optical noise components added to a discrete-time optical signal a(t) on each orthogonal polarization, whereas the term en(t) is the electrical noise contribution after the optical signal a(t) has been converted to a serial electrical signal. The noise can be independent and un-correlated. The discrete-time channel distortion model 10 also has a channel memory (correlation) length L and accordingly h1 and h2 have L terms. Moreover, the discrete-time channel distortion model 10 causes the signal a(t) to be delayed by N symbol periods ($T_{sym}$).

Using the discrete channel distortion model shown in FIG. 7 a method of converting the state of the channel at a given time into a Channel Value (CV) that can be used by equalization methods or data estimation methods is provided. The method to convert the state of a channel at a given time to a CV can be described as follows.

The discrete channel distortion model 10 has a channel memory length of L. Therefore, the maximum number of data bits in the channel at any one time is L. Each of the L data bits in the channel can be one of two binary values (e.g., '0' or '1'). Consequently, there are $2^L$ possible channel states that account for all of the binary combinations. Furthermore, if the tap-weight vectors h1 and h2 are known, then there are $2^L$ possible channel values that can be computed, each corresponding to one of the $2^L$ possible channel states. Equation (1) provides the translation of the state of the discrete channel distortion model 10 and a Channel Value (CV).

$$CV(i, t) = [\Sigma a_i(k, t) h1 (L - k - 1, t) + on1(t)]^2 + \qquad (1)$$
$$[\Sigma a_i(k, t) h2 (L - k - 1, t) + on2(t)]^2 + en(t)$$

where, $a_i(k,t) = 000\ldots0$ when i=0 at time t;
$a_i(k,t) = 000\ldots1$ when i=1 at time t;
. . . .
$a_i(k,t) = 111\ldots1$ when $i=2^L-1$ at time t.

Equation (1) can be adapted to operate on non-binary data symbols. For example, QPSK or M-ary QAM symbols can be used to derive a related equation for calculating CV.

A Dual-State Data Estimation Method can be adapted to use the Channel Values (CV) described above. The Dual-State Data Estimation Method can be described in comparison to the Viterbi Algorithm. The Viterbi Maximum-Likelihood Sequence Estimation (MLSE) method requires $2^{L-1}$ path metric and branch metric calculations. At optical data rates, assuming simplified MSE criteria for the metric calculation, the branch metrics are given generally by Equation (2).

$$z(t, j) = |r(t, j) - CV(t, j)|^2 \qquad (2)$$

where, t is discrete time; and
j=0 or 1.

At a time t, $2*2^{L-1}$ branch path metrics have to be calculated and the final survivor data paths merged together.

The Dual-State method is based on a number of assumptions: i) the channel has a memory length of L; and ii) the channel estimation (to determine h1 and h2) is accurate enough that the previous L−1 data estimates are correct.

The Dual-State method estimates the latest value for a data symbol to be either 0 or 1. Therefore, only two branch metric calculations are required. The branch metrics can be calculated from Equation (2) above using the CV's calculated using Equation (1). The next step of the method is to select the data estimate value (0 or 1) that results in a minimal summation of the calculated branch metrics.

Until this point it has been assumed that the reception signal chain 200 of the adaptive optical transponder 100 (FIG. 1) has knowledge of the values pertinent to the discrete-time channel distortion model 10 of FIG. 7. Specifically, the tap-weight vectors h1 and h2 were assumed to be known to the reception signal chain 200. However, if the EADCM 94 is implemented using a blind equalizer as in FIG. 4 (i.e., for the EADCM 94c) then the reception signal chain 200 does not require prior knowledge of the discrete-time channel distortion model 10. The CV method can start with any standard adaptive method, such as a recursive least-squares (RLS) method for adaptive equalization. Accordingly, the expectation of the error ($E_{mse}$) between estimated channel value and the received signal value can be used to control the OADCM 210 (FIG. 1).

The expectation of the error ($E_{mse}$) is calculated as follows:

First, $$r\sim(n-N') = CV(\hat{a}(n-N'), \hat{a}(n-N'-1), \ldots \hat{a}(n-N'-L)) \qquad (3)$$

where, $\hat{a}(n)$ is the estimate of symbol a(n), N' is the equalizer delay, and $r\sim(n)$ is the channel value; and Second,
the error signal is:

$$e(n-N') = r(n-N') - r\sim(n-N') \qquad (4)$$

where, the r(n) is received signal at receiver; and, $$E_{mse} = E\{e(n-N')\}. \qquad (5)$$

As shown in Equation (5), the $E_{mse}$ represents the mean square error of e(n). The $E_{mse}$ can serve as signal distortion measurement sent for OADCM adaptive control as described above with reference to FIG. 4.

For blind equalization, the initial values of the tap-weight vectors h1 and h2 can be assumed. However, if only arbitrary initial values are assumed, the adaptive method of calculating the tap-weight vectors can become stuck on a local minimum resulting in the adaptive algorithm failing to converge. To minimize the probability of non-convergence, a blind channel initialization method, described below, can be used.

As an illustrative example, the tap-weight vectors, h1 and h2, are assumed to be symmetric (which is true for chromatic dispersion). Also, if the channel Memory length, L, is 7 then both h1 and h2 have 8 components, which are:

h1(0), h1(1), h1(2) . . . h1(L)

h2(0), h2(1), h2(2) . . . h2(L)

In reality, both tap-weight vectors h1 and h2 are discrete complex values that represent the optical channel dispersion responses to an optical pulse on respective orthogonal polarizations, and P bits (symbols) will be the number of nonzero elements in both of h1 and h2. For simplicity real values are assumed for the tap-weight vectors h1 and h2. Additionally, only M components of the L components are dominant, where M is the smallest odd number greater than or equal to L/2. The values of the M dominant components can have a Gaussian distribution and are normalized according to Equations (7) and (8) given below.

$$\Sigma |h1(i)|^2 = 0.5 \qquad (7)$$

$$\Sigma |h2(i)|^2 = 0.5 \qquad (8)$$

An example with L=8, M=5 is given as an illustration:

$$h1(n) = \{Ca, Cb, Cc, Cb, Ca, 0, 0, 0\} \qquad (9)$$

$$h2(n)=\{Ca,Cb,Cc,Cb,Ca,0,0,0\} \qquad (10)$$

where Ca, Cb, and Cc are constants which satisfy Equations (7), (8), and the relation (11) below.

$$Cc>Cb>Ca \qquad (11)$$

The EADCM 94c shown in FIG. 4 does not have any prior information about channel induced PMD distortions. Consequently, the EADCM 94c is not be able to ascertain whether or not the PMD response of tap-weight vector h2 is delayed by an unknown number of symbol periods relative to tap-weight vector h1. Extreme relative dominant component positions for tap-weight vector h2 relative to tap-weight vector h1 can trap the EADCM 94c in some local minimum. The blind channel initialization method, described below, can prevent the EADCM 94c from being trapped at a local minimum. The blind channel initialization method is as follows. At step one, for a pair of tap-weight vectors h1 and h2, the method delivers, for example, 256 CV values based on equation (1), and then the EADCM 94c is operated in its adaptive operation until the EADCM 94c converges to a static status. At the static status a stable MSE error based on equation (6) becomes available, which can be referred to as $E_{mse1}$. At step two, the controller 400 implementing this process shifts the elements of the tap-weight vector h2 to the right by one bit and the first step is repeated to obtain $E_{mse2}$. At step three, step two is repeated until the Ca bit reaches the right end of tap-weight vector h2, thus providing $E_{mse3}$ and $E_{mse4}$, in relation to the above example. At step four, the tap-weight vector h1 is shifted right by one bit and steps one to three are repeated. Accordingly, $E_{mse5}$, $E_{mse6}$, $E_{mse7}$, and $E_{mse8}$ will be obtained. At step five, Ca and Cb are each halved and steps one to five are repeated providing $E_{mse9}$ to $E_{mse16}$. At step six, the original values of Ca and Cb are doubled and steps one to five are again repeated providing $E_{mse17}$ to $E_{mse24}$. Finally, at step seven, the smallest value of $E_{mse1}$ to $E_{mse24}$ is selected corresponding to the vector that is the best initial value of tap-weight vectors h1 and h2.

A number of different implementations have been described. Other arrangements and methods can be implemented by those skilled in the art without departing from the spirit and scope of the present invention.

We claim:

1. A communications device comprising:
   an Optical domain Adaptive Dispersion Compensation Module (OADCM) operable to provide a first dispersion compensation to a received signal, the received signal having a plurality of wavelengths;
   an Electrical domain Adaptive Distortion Compensation Module (EADCM) coupled to the OADCM and operable to provide a second dispersion compensation to the received signal; and
   a controller coupled to both the OADCM and the EADCM, the controller operable to selectively control a level of the first and the second dispersion compensation to be applied to the received signal, where the controller controls the EADCM based on feed forward information provided to the controller from the OADCM.

2. The communications device of claim 1, wherein the controller controls operating characteristics of at least one of the OADCM and the EADCM.

3. The communications device of claim 2, wherein the controller controls the OADCM based on feedback information provided to the controller from the EADCM.

4. The communications device of claim 2, further comprising:
   an Optical Amplifier with automatic-Gain Control (OAGC) coupled to the OADCM and the controller.

5. The communications device of claim 4, further comprising:
   a PIN photodiode detector in combination with a transimpedance amplifier (PIN/TIA) coupled to the OAGC and the controller.

6. The communications device of claim 1 integrated into an optical signal receiver, wherein the EADCM provides signal distortion measurements to the controller taken from an incoming signal, the controller in turn adjusting the respective operating characteristics of the OADCM, and wherein in operation at least one of the EADCM and OADCM apply dispersion compensation to the incoming signal.

7. The communications device of claim 6, wherein the EADCM provides polarization mode dispersion compensation.

8. The communications device of claim 6, wherein the OADCM provides chromatic dispersion compensation.

9. The communications device of claim 6, wherein the EADCM includes an equalizer that produces symbol estimates.

10. The communications device of claim 6, wherein the EADCM includes a blind equalizer that produces error values.

11. The communications device of claim 1 integrated into an optical signal transmitter, wherein in operation at least one of the EADCM and OADCM provides pre-emphasis to a transmitted optical signal to substantially overcome dispersion the transmitted optical signal will encounter en route to a receiver.

12. A method comprising:
   i) measuring signal distortion of an electrical signal having a plurality of channels;
   ii) processing the signal distortion measurements to produce at least one control value for one of an optical domain adaptive dispersion compensation module ("OADCM") or an electrical domain adaptive distortion compensation module ("EADCM"); and
   iii) selectively applying the at least one control value to the EADCM to provide dispersion compensation to the optical signal, using feed forward information provided to the controller from the OADCM.

13. The method according to claim 12, wherein the signal distortion measurements are signal quality measurements.

14. The method according to claim 12, wherein the signal distortion measurements are symbol error estimates.

15. The method according to claim 12, wherein the signal distortion measurements are error values.

* * * * *